United States Patent [19]

Sims, deceased et al.

[11] Patent Number: 4,681,431

[45] Date of Patent: Jul. 21, 1987

[54] OPTICAL RANGING ANTI-COLLISION TECHNIQUE AND SYSTEM

[75] Inventors: John C. Sims, deceased, late of Sudbury, Mass., by Lucille Sims, executrix; Charles J. Mundo, Jr., Sudbury, Mass.

[73] Assignee: Sineco, Inc., Sudbury, Mass.

[21] Appl. No.: 706,193

[22] Filed: Feb. 27, 1985

[51] Int. Cl.$^4$ .......................... G01C 3/08; G01P 3/36
[52] U.S. Cl. ........................................... 356/4; 356/28
[58] Field of Search ..................... 356/1, 4, 28, 29; 340/936, 942; 367/909

[56] References Cited

U.S. PATENT DOCUMENTS

| | | | |
|---|---|---|---|
| 3,620,626 | 11/1971 | Daly et al. | 356/4 |
| 3,892,483 | 7/1975 | Säufferer | 356/4 |
| 4,308,536 | 12/1981 | Sims, Jr. et al. | 343/7 VM |
| 4,589,770 | 5/1986 | Jones et al. | 356/1 |

FOREIGN PATENT DOCUMENTS 1929587 9/1979 Fed. Rep. of Germany .......... 356/4

Primary Examiner—L. T. Hix
Assistant Examiner—David M. Gray
Attorney, Agent, or Firm—Robert F. O'Connell

[57] ABSTRACT

A collision avoidance system for preventing collision between vehicles capable of moving along the same general path, which system includes a vehicle having a device for emitting optical pulses and another vehicle having a detector which uses an optical scanner defining a substantially triangular scan field. The detector responds to the emitted optical pulses and determines the range between the vehicles and the closing speed between them. An alarm system responds to the closing speed determination to permit evasive action to be taken when the closing speed exceeds a selected value.

9 Claims, 6 Drawing Figures

OPTICAL RANGING ANTI-COLLISION TECHNIQUE AND SYSTEM

INTRODUCTION

This invention relates generally to detection and ranging techniques and, more particularly, to systems using optical techniques therefor for providing range and closing rate information so as to avoid collisions, as between moving vehicles, for example.

BACKGROUND OF THE INVENTION

An effective and reliable collision avoidance system which can be produced and utilized at relatively low cost would be helpful in preventing vehicular accidents either in an open environment, such as on the open highway, or in a closed environment, such as in a mine, or the like. It is desirable that techniques be devised which avoid unwanted interference with undesired electronic or other signals involved, while at the same time giving clear and accurate indications of the distance (range) between two objects, at least one of which is moving, e.g., motor vehicles, and the closing (or opening) rate between the vehicles (i.e., the rate of change of such distance) so that, when the closing rate exceeds selected threshold levels at specified ranges, appropriate action can be taken to avoid collision therebetween. For example, such a system can provide an audible or a visual alarm, or both, to alert the driver of one of the vehicles to the danger of the situation, or the system can be used to take automatic action, e.g., to actuate an automatic vehicular braking system, in order to avoid collision.

Description of the Prior Art

Systems for avoiding collision between moving vehicles have been suggested in the past utilizing radar techniques. Such a system is described, for example, in U.S. Pat. No. 4,308,536, issued to John C. Sims, Jr., et al., on Dec. 29, 1981. One of the reasons that radar has often been selected for such systems is that a relatively narrow frequency band, or spectrum, signal can be used by the system to minimize interference with the radar signal by background or other radiation. A particular frequency can be chosen, for example, so that the actual ambient energy normally expected in the vicinity where the vehicle is to be used is relatively low at such frequency. Another attractive feature of a radar based system has been that it is self-contained in that a single vehicle utilizes equipment which both irradiates a target area and receives signal echoes therefrom.

An important disadvantage of the use of radar based systems, however, is that such systems appear to have relatively poor angular resolution, due to the inherently wide beam thereof. At the frequencies normally suggested, a relatively large antenna is required even for a 1° beam. If a smaller antenna providing a wider beam is used, a relatively complicated data processing system must be used to process the data in order to effectively eliminate unwanted signals from the wider beam. Utilizing higher frequencies to provide a narrow beam in a more compact system requires more sophisticated and highly technologically advanced components which are not presently commercially available or which are available only at extremely high costs.

Moreover, radar techniques suffer from multi-path cancellation effects which effectively cause the system to become inoperative at some ranges in certain environments. Radar systems also tend to become "confused" by spurious reflections, or echoes, from objects such as bridge supports, overhead signs, guard rails, and the like. Maintenance and repair of radar systems usually requires a relatively high level of skill because the processing techniques used for radar signals, in analog and/or digital form, is relatively complex. It has also been suggested that microwave radiation from the transmission of radar signals constitutes a hazard to persons in the vicinity thereof.

It is desirable, therefore, to devise a system which avoids the problems raised by using such radar techniques.

BRIEF SUMMARY OF THE INVENTION

In accordance with the invention a collision avoidance system is devised using solely optical techniques which system utilizes a cooperative optical data communication system in which one vehicle, for example, provides one or more illuminating optical signals radiated therefrom, while another vehicle receives such one or more signals and suitably detects their presence and processes them to determine the distance between the vehicles (range) and the rate of change of such distance (a closing or opening rate). In one preferred embodiment thereof, for example, a pair of optical sources, e.g. light radiating sources, are placed at a known distance apart on the rear of a first vehicle. Such sources provide light signals directed from the rear of the vehicle. A forward-looking optical detection system is mounted on the front of a second vehicle which is moving behind the first vehicle and detects the presence of such signals as they are received at the detection system. The detection of the radiated light from each of the light sources permits a determination of the distance between the vehicles, while the relative angular positions of the two signals as detected in the detection system is a measure of the angular direction between the two vehicles. Once the distance between the vehicles is determined, as by a suitable lookup table, for example, the closing (or opening) rate can be determined by computing the rate of change of such distance over successive time intervals using known calculation techniques.

When the closing rate exceeds selected threshold values at specified distances, appropriate action can be taken either by alarming the driver of the rearward vehicle so as to permit him to act accordingly to avoid any potential danger or by actuating an automatic braking system, for example, for such purpose.

DESCRIPTION OF THE INVENTION

The invention can be described in more detail with the help of the accompanying drawings wherein FIG. 1 shows a geometrical illustration of a typical situation in which the invention can be used;

Figure 1:
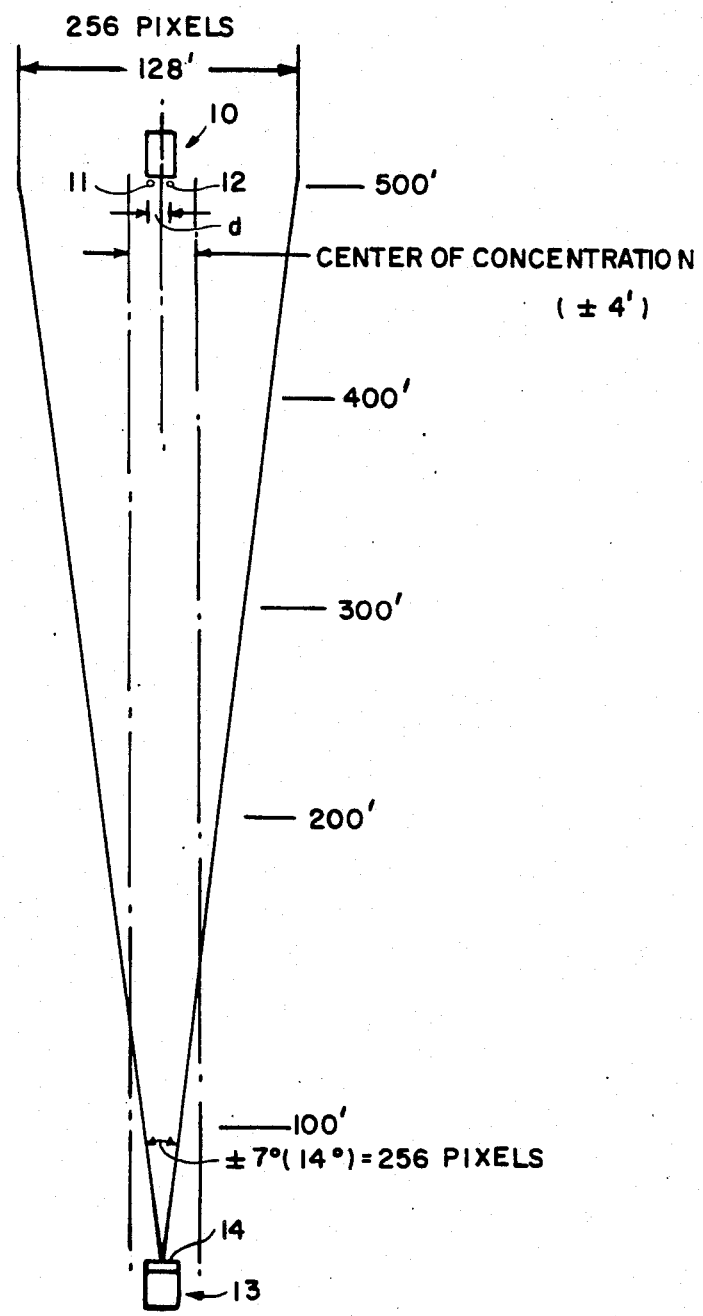

The principle of operation of the system can be illustrated diagrammatically by FIG. 1 wherein an exemplary vehicle 10 having two optical signal radiating sources 11 and 12 mounted on the rear thereof is moving in front of an exemplary vehicle 13 having an optical detector system 14. The light sources 11 and 12 are separated by a specified fixed distance "d" which can be standardized. In a particular embodiment, for example, such distance may be four feet. For simplicity in explanation, in the situation depicted, the forward vehicle is shown as directly ahead of the rearward vehicle.

In a particular embodiment the optical detector system 14 is mounted at the front of vehicle 13 and is provided with a device for receiving radiated light from sources up to distances of at least 500 feet or more and within an angle which is sufficiently wide to include a reasonable field of view, e.g., up to at least 14° (i.e. ±7°).

Figure 2:
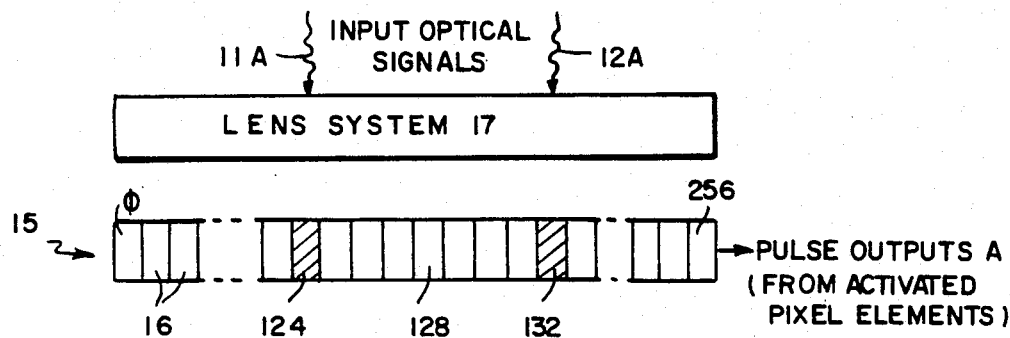
FIG. 2 shows in diagrammatic form a portion of an optical detection system of a preferred embodiment of the invention.

In a particular embodiment the detector system can be in the form of a charge-coupled device (CCD) 15, as shown diagrammatically in FIG. 2, which comprises a linear array of photosensitive elements (pixels) 16 each of which can respond to incoming optical signals and provide an electrical output representative thereof. Such a device may be of the type available commercially as a Model CCD 111 line scan image sensor having 256 elements and sold by Fairchild Semiconductor, Inc.

A suitable lens system 17 positioned in front of CCD 15 forms an image of the roadway ahead onto the elements of the array. The optical lens system can be selected such that at a range of 500 feet each element of the array in effect "sees" an area which is 6 inches wide by 10 feet in height so that the overall field of view at a 500 foot range is 128 feet wide by 10 feet high. The centermost elements of CCD detector 15 "see" the general location directly ahead.

The radiating sources 11 and 12 can be in the form of a pair of lights spaced apart at a distance of 4.0 feet on the rear of vehicle 11. Each light is turned on and off at a selected rate, e.g., such that each flashes for a time duration of 50 microseconds. At a particular distance the incoming optical signals 11A and 12A from the pair of flashing lights are detected by two of the elements 16 which are spaced apart from each other, the particular elements and their spacing depending on the distance between the two vehicles.

Thus, in order to determine the range between the vehicles, the separation between the two activated pixel elements of the detector must be determined. As seen by the geometry of FIG. 1, as the range decreases the separation between the activated elements increases. By using known triangulation techniques ranges can be computed as a function of pixel element separations. Such computations are capable of being performed, as by using suitable microprocessor computerized techniques, or they can be pre-computed and stored in a suitable look-up table.

Once the range has been so determined, discrete changes in range can then be determined (e.g. when the pixel separation increases, or decreases, by one pixel element) and the time interval between such changes can be tracked so that a determination of changes in range can be made, i.e., an effective determination of the closing (or opening) range rate between the vehicles.

Figure 5:
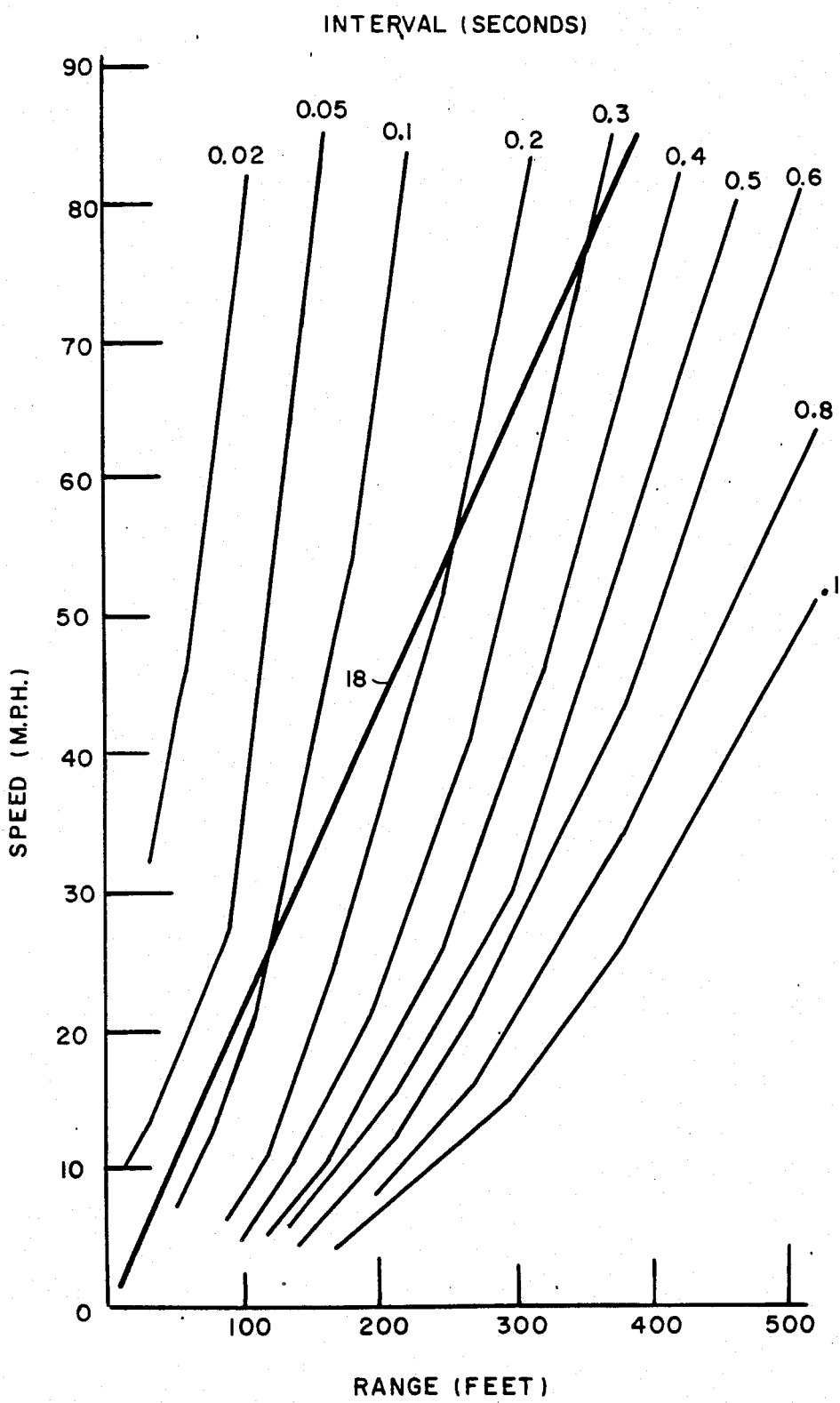
FIG. 5 shows a graph of the relationships of certain parameters useful in understanding the operation of the invention.

As can be seen by FIG. 5, for an exemplary situation, a graphical representation of the relationships between range (in feet) and range rate (in miles per hour) for discrete time intervals (in seconds) can be computed. For a particular set of road conditions certain of such relationships can be adjudged to represent potentially dangerous ones where, for example, collision would be likely should no action be taken to avoid it (assuming that the frontward vehicle is in the center region of concentration of the rearward vehicle). In FIG. 5 such dangerous conditions are represented, for example, for dry road conditions by the heavy line 18 wherein values to the left of (i.e. above) such line represent dangerous conditions and values to the right of (i.e. below) such line do not. For other road conditions (raining, snow or ice covered, etc.) other similar lines can be shown to determine values which represent dangerous or near-dangerous conditions.

A final decision on whether action need be taken depends on the direction in which the rearward vehicle is traveling relative to the frontward vehicle. Thus, a determination of whether the frontward vehicle lies in the center region of concentration of the rearward vehicle must be made. If the front vehicle lies outside such center of concentration then clearly no threatening situation exists, even if the closing rate at the range involved lies within the danger region of FIG. 5. If, on the other hand, the front vehicle at any current computation time lies within such center of concentration and the closing rate at the current range lies in the danger region of FIG. 5, appropriate action to avoid collision is required, either by alerting the driver of the rearward vehicle or by activating an automatic braking system.

Figure 3:
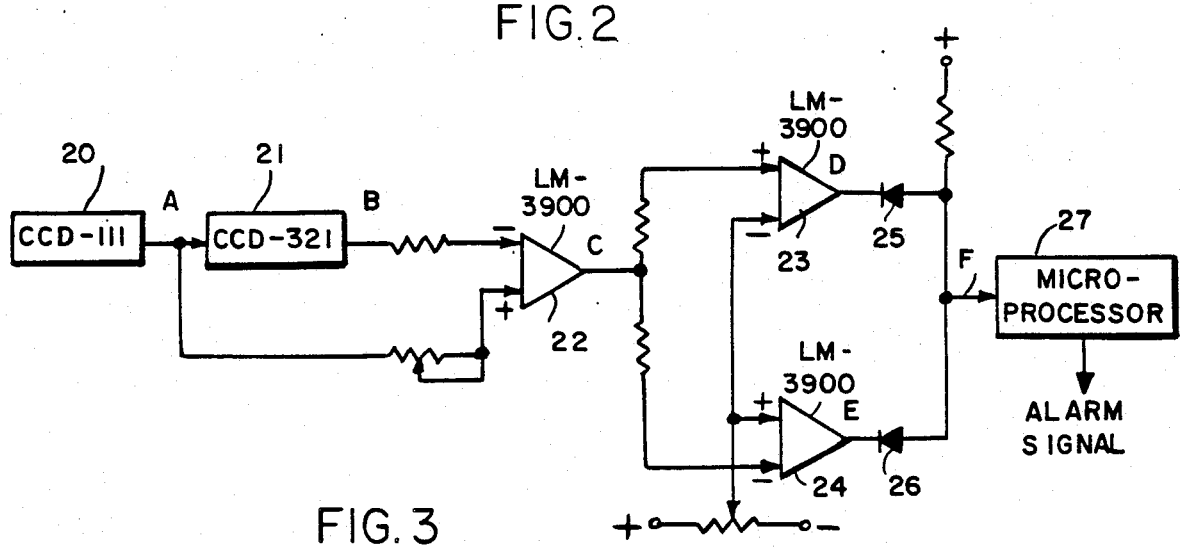
FIG. 3 shows a partial circuit and partial block diagram of a portion of the optical detection system of a preferred embodiment of the invention.
Figure 4:
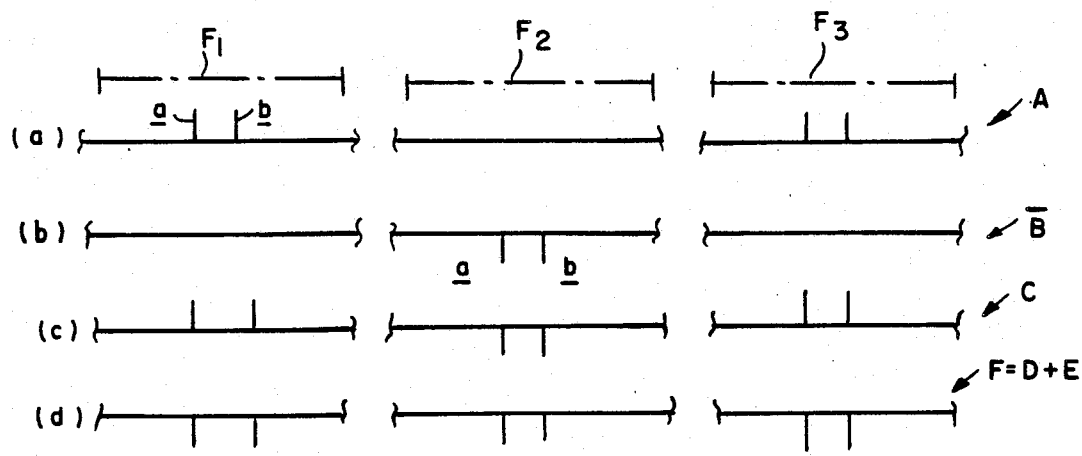
FIG. 4 shows exemplary wave forms of signals present in the circuit of FIG. 3.

An exemplary system for providing the desired operation for such purpose is shown in block diagram form in FIG. 3. As can be seen therein a CCD detector 20 comprising the above discussed pixel elements, and identified as a CCD-111 unit, provides an output A comprising a pair of pixel output signals, shown as pulses "a" and "b" in the signal depicted as "A" in FIG. 4(a). The received pulse signals from pulsating light sources 11 and 12 activate pixels in alternate frame cycles $F_1$, $F_2$, $F_3$...etc., as shown in FIG. 4(a). The pulse output signal A is then shifted through a CCD shifter unit 21, identified as a CCD-321 unit also available from Fairchild Semiconductor Corporation, to produce the output B, depicted by its inverted form B in FIG. 4(b), during the intervening frames The current output A and the current output B (representing the previous shifted output A) are compared in comparator unit 22, shown as using an analog comparator circuit LM-3900 also available from Fairchild Semiconductor Corporation. The output C from comparator unit 22 is depicted in FIG. 4(c). An output C only occurs when signals A and B are different and accordingly ambient constant signals are cancelled so that output C represents a true comparison of the outputs A and B.

The positive and negative excursions of the output C are combined by two further LM-3900 units 23 and 24 and the diodes 25 and 26, as shown, and provide a single pair of pulses at each frame as output F, depicted in FIG. 4(d). The location of the pulse pairs is determined by the relative azimuth positions of the vehicles. For such operation, the pulse rates of the light sources preferably should be approximately one-half the scan rate of the CCD-111 unit. The pulse pairs are supplied to a suitable microprocessor 27 which is used to make the various range, range rate and azimuth determinations discussed above. Any conventional and readily available microprocessor can be utilized for such purpose, e.g., a microprocessor chip available from Zylog, Inc., as Model Z-80. Such microprocessor can be suitably programmed to process the input information thereto in accordance with the flow diagram depicted in FIG. 6 and to provide an alarm signal under appropriate conditions, as required. The specific programming of a microprocessor to perform the steps shown in the flow chart of FIG. 6 would be well known to those skilled in the art.

Figure 6:
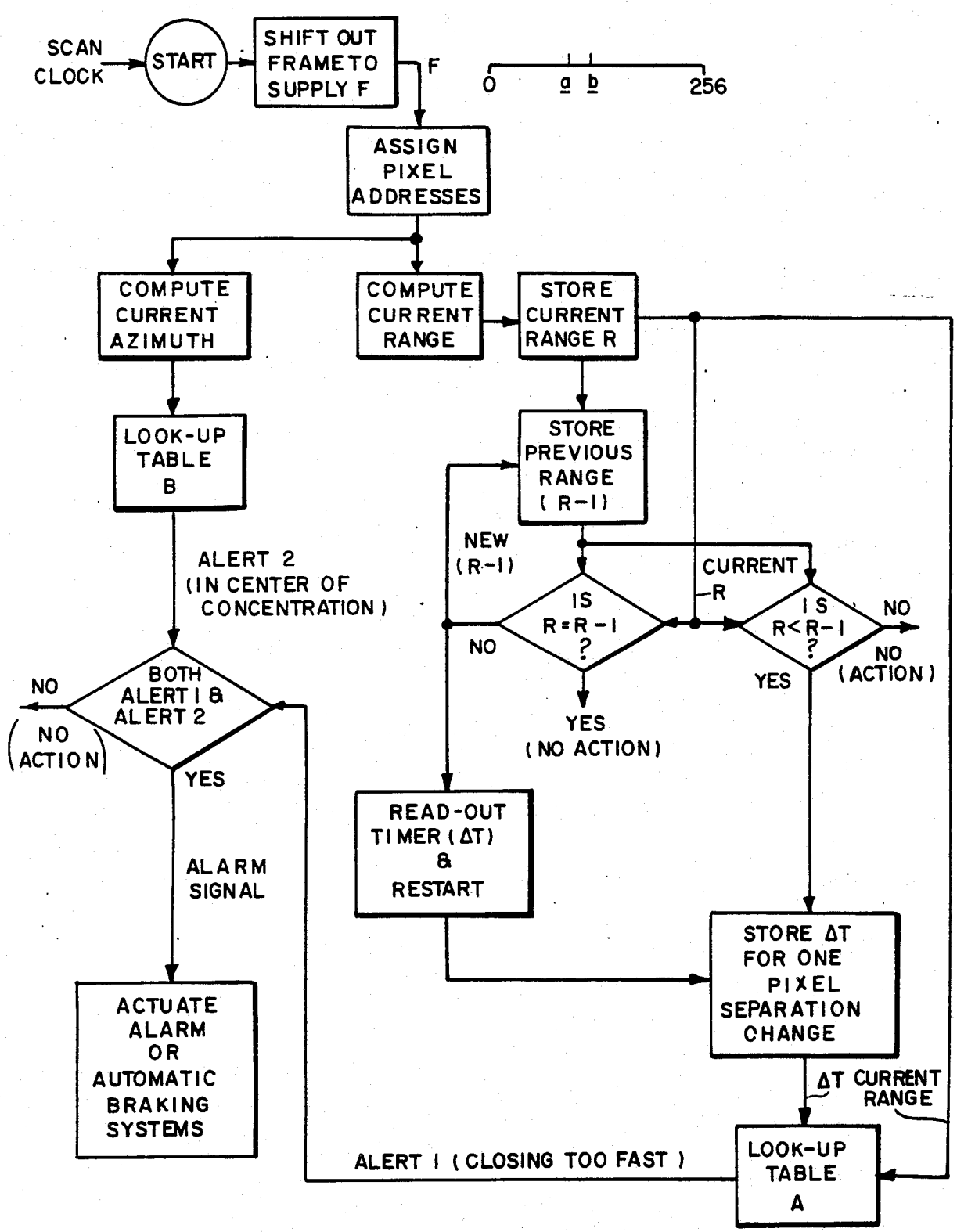
FIG. 6 shows a general flow-diagram of the microprocessor operation of the preferred embodiment of FIG. 3.

As seen in FIG. 6 the output F, comprising a pulse pair representing activated pixel elements, is used to compute the range (the distance between the vehicles). Thus, the incoming pulses of the pair are assigned pixel addresses (each pixel element from 0 to 256 has associated with it a specified address). The pixel addresses of such pulses can be supplied, for example, to a two-dimensional look-up table, or alternatively the addresses can be subtracted to provide a single address (representing the separation between activated pixel elements) to a one-dimensional look-up table, in which tables the ranges associated with such addresses or address separations have been pre-computed and stored. In such a way the range R is determined.

The current range R is temporarily stored for a particular time frame cycle and the range for the previous time frame cycle (the latter being depicted as range $R-1$) is also stored. The current range R is compared with the previous range $(R-1)$. If R is equal to $R-1$, no further computation occurs (the vehicles remain at the same range, neither opening nor closing the distance between them). If R is not equal to $R-1$ a timer is read-out and restarted. The output of the timer represents the time interval ($\Delta T$) over which a discrete change in range has occurred, i.e., a change in one pixel element separation. If R is not equal to $R-1$, the new range is stored as $(R-1)$ and the next range value is stored as R.

Further computation then occurs only if $R<R-1$, representing a "closing" range rate (if R is not less than $R-1$, representing an "opening" range rate, no action is taken). If $R<R-1$ the change in range (a change in one pixel separation value in the "closing" direction) over the time interval T represents an effective range closing rate which is supplied together with the range to a two-dimensional look-up table A which effectively contains the information shown in FIG. 5 so as to provide a first alert output (ALERT 1) only when a danger condition occurs (above line 18 for dry road conditions). Such an alert output signifies that the closure rate has exceeded a selected threshold at a specified range. Other different look-up tables can be used for such purposes for other road conditions as discussed above.

In addition to such information the angular relationship of the direction of travel of the rear vehicle relative to the forward vehicle must also be determined as shown at the left of the flow diagram of FIG. 6.

For such latter determination the azimuth information can be determined by computing the average of the pixel addresses. Thus, if the pixel addresses are "a" and "b", the azimuth is represented by (a+b)/2. For example, if the addresses of the activated pixels are at pixel positions 124 and 132 (see FIG. 2), the average thereof [(124+132)/2] is 128 which represents the center pixel element of CCD detector 20, indicating that the forward vehicle is dead ahead in the rear vehicle's center of concentration (see FIG. 10. So long as the azimuth lies within the center of concentration at a specified range (as determined for example, by pre-computing the centers of concentration at specified ranges and storing them in a look-up table B) a second alert signal (ALERT 2) is produced as shown in FIG. 6. If both an ALERT 1 signal and an ALERT 2 signal are present an appropriate audible and/or visible alarm system or an automoatic braking system is activated.

While the above described embodiment is preferred, other embodiments of the invention can be devised by those in the art within the spirit and scope of the invention. For example, electronic or electro-mechanical optical scanning devices other than the CCD devices discussed above can be used to provide the optically scanned information and other techniques for handling such information using hard-wired or other microprocessor logic can be used. However, the invention is not to be construed as limited to the particular embodiment depicted, except as limited by the appended claims.

What is claimed is:

1. A system for avoiding collision between a first vehicle and a second vehicle each capable of moving along the same general path, said system comprising
   at least one means mounted on said first vehicle for emitting optical pulse signals;
   detection means mounted on said second vehicle including
      optical scanning means, the scanning operation thereof defining a substantially triangular field of scan, said scanning means being responsive during its scanning operation to the optical pulse signals emitted by said at least one emitting means for providing output scanned information;
      means responsive to said output scanned information for determining the range between said first and second vehicles,
      means responsive to changes in said range determination as a function of time for determining the closing speed between said vehicles, and
   alarm means responsive at least to said closing speed determination for permitting evasive action to be taken by said second vehicle when said closing speed exceeds a selected value to avoid collision with said first vehicle.

2. A system in accordance with claim 1 wherein said detection means further includes
   means responsive to said output scanned information for determining the angular relationship between said first and second vehicles; and
   said alarm means is further responsive to said angular relationship for permitting said evasive action to be taken when said angular relationship indicates that said second vehicle is moving along a potential collision path with said first vehicle.

3. A system in accordance with claim 2 wherein said range determining means, said closing speed determining means, and said angular relationship determining means comprise a microprocessor.

4. In a system in accordance with claim 3 wherein
   said emitting means comprises a pair of optical pulse emitting sources mounted at a selected distance apart on said first vehicle; and
   said optical scanning means includes a plurality of optically responsive elements a pair of said optically responsive elements responding to the optical pulse signals from said pair of optical sources, the relationship between said responding pair of optically responsive elements representing the range between said first and second vehicles.

5. A system in accordance with claim 4 wherein said optical scanning means comprises a linear array of photosensitive elements each of which can respond to said optical pulse signals, the separation between a pair of responding photosensitive elements in said linear array representing the range between said first and second vehicles.

6. A system in accordance with claim 5 and further wherein the average position of said pair of responding photosensitive elements in said linear array represents the angular relationship between said first and second vehicles.

7. A system in accordance with claim 6 wherein said linear array of photosensitive elements is formed by a charge-coupled device comprising a selected number of said photosensitive elements.

8. A system in accordance with claim 7 wherein said charge-coupled device comprises 256 photosensitive elements.

9. A system in accordance with claim 1 wherein said optical scanning means includes optical lens means mounted adjacent said optical scanning means for focussing said optical pulse signals on to said optically responsive elements.

* * * * *